United States Patent

Reinhall

[11] 3,902,962

[45] Sept. 2, 1975

[54] LIQUID SEPARATOR FOR LIGNOCELLULOSE CONTAINING MATERIAL

[76] Inventor: Rolf Bertil Reinhall, Killingevagen 16, 181 64 Lidingo, Sweden

[22] Filed: Apr. 30, 1973

[21] Appl. No.: 355,511

Related U.S. Application Data

[63] Continuation of Ser. No. 89,432, Nov. 13, 1970, abandoned.

[30] Foreign Application Priority Data
Nov. 14, 1969  Sweden.............................. 15676/69

[52] U.S. Cl. ................ 162/246; 162/242; 162/251; 210/413
[51] Int. Cl. ............................................. D21c 7/06
[58] Field of Search ........... 162/237, 242, 246, 251, 162/17, 233, 247; 210/413, 414, 415

[56] References Cited
UNITED STATES PATENTS

| | | | |
|---|---|---|---|
| 2,459,180 | 1/1949 | Richter ............................... | 162/246 |
| 3,041,232 | 6/1962 | Richter et al. ........................ | 162/17 |
| 3,188,267 | 6/1965 | Guerrieri ............................. | 162/237 |
| 3,199,441 | 8/1965 | Haug................................. | 210/415 X |
| 3,294,626 | 12/1966 | Matthews......................... | 162/246 X |
| 3,404,065 | 10/1968 | Ingemarsson ....................... | 162/233 |
| 3,471,366 | 10/1969 | Reinhall............................. | 162/237 |

*Primary Examiner*—S. Leon Bashore
*Assistant Examiner*—Alfred D'Andrea, Jr.
*Attorney, Agent, or Firm*—Eric Y. Munson

[57] ABSTRACT

A liquid separator for de-watering a liquid suspension of lignocellulosic material prior to introducing the same into the reaction chamber where it is treated under elevated pressure. The reaction vessel extends in a vertical direction, and the liquid separator is mounted in the upper portion thereof and comprises a container having a closed bottom and an open top within which is housed a perforated substantially frusto-conical casing having a closed bottom and an open top merging with the open top of the container. A vertical screw conveyor is mounted to rotate within the casing to progressively advance the lignocellulosic material towards the top of the casing and the container while forcing liquid therefrom and to cause the dewatered material to fall by gravity into the reaction vessel.

2 Claims, 1 Drawing Figure

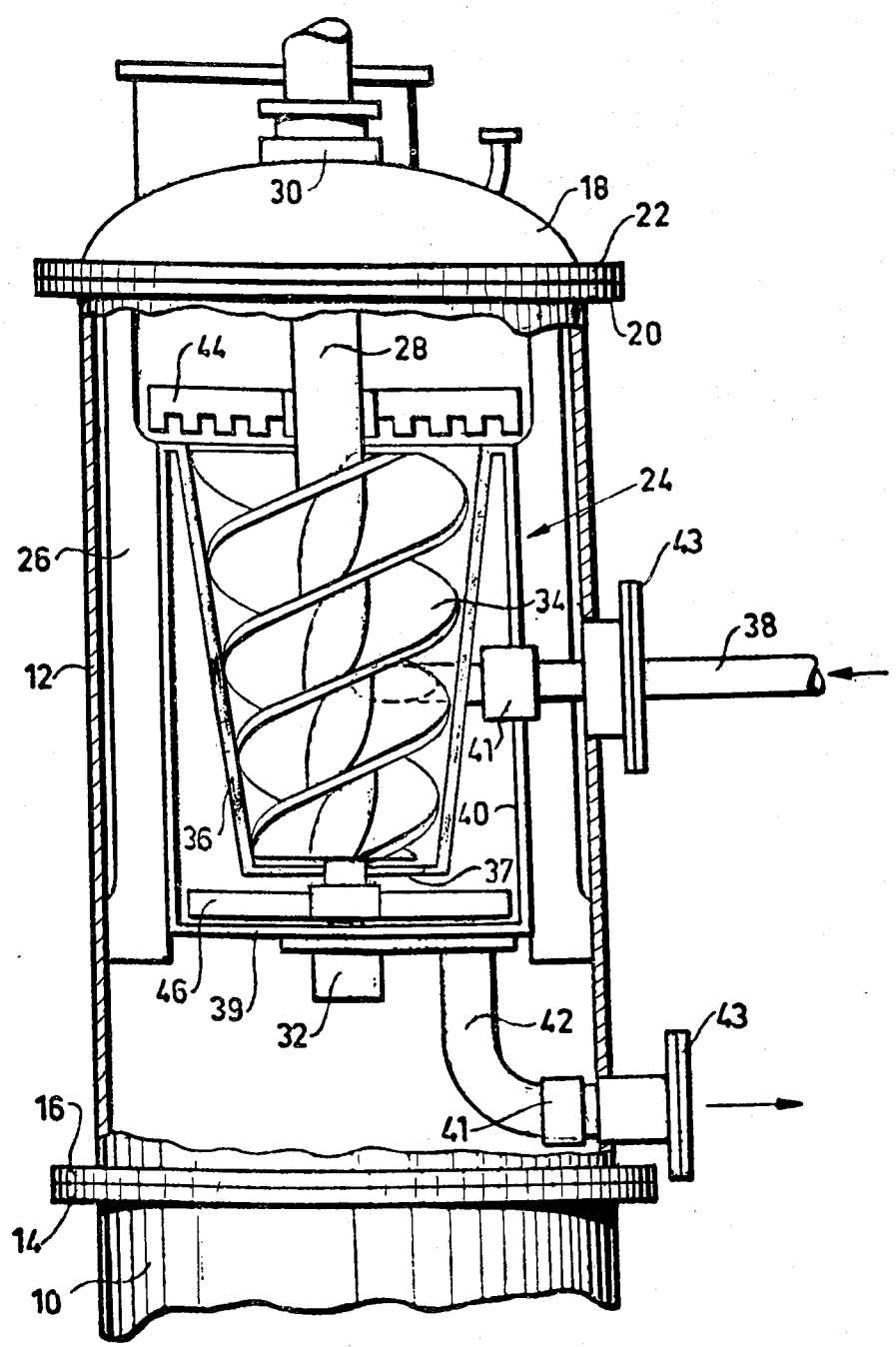

LIQUID SEPARATOR FOR LIGNOCELLULOSE CONTAINING MATERIAL

This application is a continuation of application Ser. No. 89,432, filed Nov. 13, 1970, and now abandoned.

BACKGROUND OF THE INVENTION

This invention relates generally to a liquid separator for lignocellulose containing material.

More particularly this invention relates to a device intended in the treatment of lignocellulose containing material in a reaction vessel for operation under elevated pressure to remove liquid from a suspension of the material prior to its introduction into the vessel. The feed-in of the material in the state of a liquid suspension has for its purpose to render easier the transport of the material to the reaction vessel or between various levels in a closed system of which the reaction vessel forms a component. The reaction vessel may be a digester. The liquid may be cooking liquor or impregnation liquid utilized in a cellulose cooking process.

Various methods have been developed for both the transport of the material and the removal by separation of the transporting liquid, for instance when a subsequent process is to be conducted in vapour phase without presence of liquid or when chemicals of some other nature are to be applied then those used in a preceding operational step of the process.

It is known to provide a liquid separator as a separate container outside the reaction vessel proper. The separator is then to be constructed as a pressure vessel which thus can withstand the same pressure as the reaction vessel.

MAIN OBJECT OF THE INVENTION

One main object of the invention is to provide a liquid separator without having to consider the working pressure prevailing in the system with resultant simplified structure.

Another main object of the invention is to provide the closed system with a liquid separator which demands considerably less space than the types hitherto known.

SUMMARY OF THE INVENTION.

According to one main feature of the invention a liquid separator is built-in in the top portion of the reaction vessel comprising a screw having a vertical axis and surrounded about its periphery by a perforated casing, said screw being designed to feed the material in upward direction to the top edge of the casing and to be passed therefrom into the vessel, the separated-off liquid flowing downwards to an outlet separate from the vessel.

One main advantage with the invention is that the separator container is built in as an upper extension of the reaction vessel, the vertical length of which thus be increased only having to to correspond to the height of the separator container.

Further objects and advantages of the invention will become apparent from the following description, considered in connection with the accompanying drawing, which forms part of this specification and which is a vertical sectional view of an upper portion of a reaction vessel with a liquid separator mounted therein.

DESCRIPTION OF THE PREFERRED EMBODIMENT

Referring now to the drawing, reference numeral 10 denotes the portion of the lateral wall of a reaction vessel, such as a digester, on the top of which is mounted a lateral wall 12 of suitably the same cylindrical shape as that of the lateral wall 10 of reaction vessel. The two lateral walls may be interconnected by means of abutting end flanges 14, 16 and screw joints (not shown). The upper wall 12 mounted on the wall 10 is covered by a lid or top cover 18, the connection between said elements being provided for in the same manner by means of abutting end flanges 20, 22 and screw joints (not shown). The parts described provide a structure permitting them to resist the pressure prevailing in the digester of e.g. 7 to 8 atmospheres excess pressure.

Built-in in the upper lateral wall portion 12 is according to the invention a liquid separator generally denoted 24. Said separator is formed with a support 26 suspended in the lid or top cover 18 and laterally guided by the inner cylindrical wall 12 of the container. A vertical shaft 28 passing through a seal 30 located centrally in the lid or top cover 18 is driven by a motor (not shown) and located outside the vessel. At its lower end the shaft 28 is guided by a bearing 32 fixed in the support 26. The shaft 28 carries a screw 34 completely or partially surrounded by a wall casing 36 which has a frusto-conical shape as shown in the illustrated embodiment and permeable to liquid e.g. by being formed with circular or slot-like perforations. The screw 34 conforms to the interior configuration of the wall casing 36. A pumpable suspension of the material to be treated in the digester is supplied through a tube conduit 38 opening tangentially into the interior of the wall casing 36 at some distance above the bottom 37 thereof. If desired, said bottom may also be formed with perforations. The wall casing 36 may be surrounded by a container 40 provided with a spaced bottom 39, and which forms part of the support 26. Attached to said container bottom is a discharge tube 42 extending through the lateral wall 12.

After the liquid suspension of the material having been fed into the perforated wall casing 36, the cellulosic material is carried upwards by the screw 34, whereas the liquid is out through the perforations of said wall casing and flows by force of gravity force downwards towards the bottom 39 of the container 40 from which discharged through the tube 42. The material, from which the liquid has been separated and which becomes de-watered during its upward helical progress, is pushed laterally over the upper edge of the wall case 36 and falls down into the digester 10 for further treatment in said reaction vessel.

A toothed scraper 44 may be attached to the top of shaft 28 to make sure that the material is continuously carried over the top edge of the separator container 36. An agitator 46 may be mounted on the shaft 28 below the perforated separator container 36 to prevent the drainage opening of the discharge tube 42 from becoming clogged.

The inlet tube 38 and/or the discharge tube 42 of the separator 24 may be constructed as detachable members so that they in an easy manner by means of sockets 41 or similar members and stuffing boxes 43 can easily and removably be attached from outside the separator. As previously stated, the separator is in turn, attached to the top cover 18 of the extension 12 of the reaction vessel so that when necessity arises it can be removed from the reaction vessel by releasing the screw joints connecting the end flanges 20, 22 with one another.

The vertical conveyer screw 34 positioned within the liquid separator can be provided with one or a plurality of thread entrances. The thread of the screw is suitably made so that the angle between the longitudinal axis of the screw and the radius at the upper surface of the thread exceeds 90°. This inclination causes the material, such as wood chips, for example, to be pressed with great force against the perforated inner surface of the screening casing 36 and by the increased friction force produced in this way prevented from rotating with the screw, the upwardly conveying capacity of which thus becomes correspondingly great. The spacing between the inner surface of the screening wall 36 and the screw 34 must be less than the diameter of each individual perforation hole, if the perforations have circular shape, or less broad when the perforations have elongated i.e. slotted shape. In this way the screw thread on its upwardly directed movement is capable of continuously keeping the screening plate free from clogging material.

SHORT DESCRIPTION OF POSSIBLE VARIATIONS

The screening wall casing 36 may have cylindrical shape and the threads of the screw a corresponding outer configuration. A plurality of liquid separators may be mounted one above the other in a reaction vessel, such as a digester, the lateral wall of which thus is given a corresponding extension. The individual liquid separators, which may be disposed for working in parallel with, or in a subsequent series after one another for dewatering the ligno-cellulose containing material, are suitably driven by a common central shaft 28. The liquid separators can be given mutually differing shape and be driven by separate, concentrically disposed shafts, in which case different speeds can be imparted to the various liquid separators.

While one more or less specific embodiment of the invention has been shown and described, it is to be understood that this is for purpose of illustration only and that the invention is not to be limited thereby, but its scope is to be determined by the appended claims.

What is claimed is:
1. A liquid separator unit for de-watering a liquid suspension of lignocellulosic material for a walled, vertical reaction chamber having a top cover normally sealing the same, in which chamber the material is subjected to treatment under elevated pressure, comprising:
   a. a vertical container having a closed bottom and an open top mounted in the upper portion of the reaction vessel at a spaced distance from the vertical walls thereof;
   b. an inverted frusto-conical casing within said vertical container having a closed bottom spaced above the bottom of said container and an open top which merges with the top of said container;
   c. perforations in said casing for draining liquid therefrom;
   d. a vertical screw conveyor journalled in the top cover of the reaction chamber and positioned to rotate within said casing so as to force liquid from the material through said perforations and so as to prevent clogging thereof while progressively advancing the cellulosic material towards the open top of the casing and said container to cause it to spill over and fall by gravity into the reaction vessel, said vertical screw conveyor being so disposed that the angle between the longitudinal axes thereof and the radius of the upper surface of the thread exceeds 90°;
   e. means for introducing the liquid lignocellulosic suspension into said frusto-conical casing at a location spaced above the bottom of said casing;
   f. means for draining the separated liquid from the bottom of said container;
   g. means connecting said separator to the top cover and engaging the walls of the reaction chamber to permit said separator to be mounted as an individual unit separate from the reaction chamber; and
   h. agitator means arranged between the bottom of said perforated casing and the bottom of said container to prevent clogging of the drainage means.

2. A liquid separator according to claim 1, in which scraper means are provided to assist in removing the de-watered material from the top of said container and said casing.

* * * * *